C. J. Hill,

Rose Engine,

N° 76,631.   Patented Apr. 14, 1868.

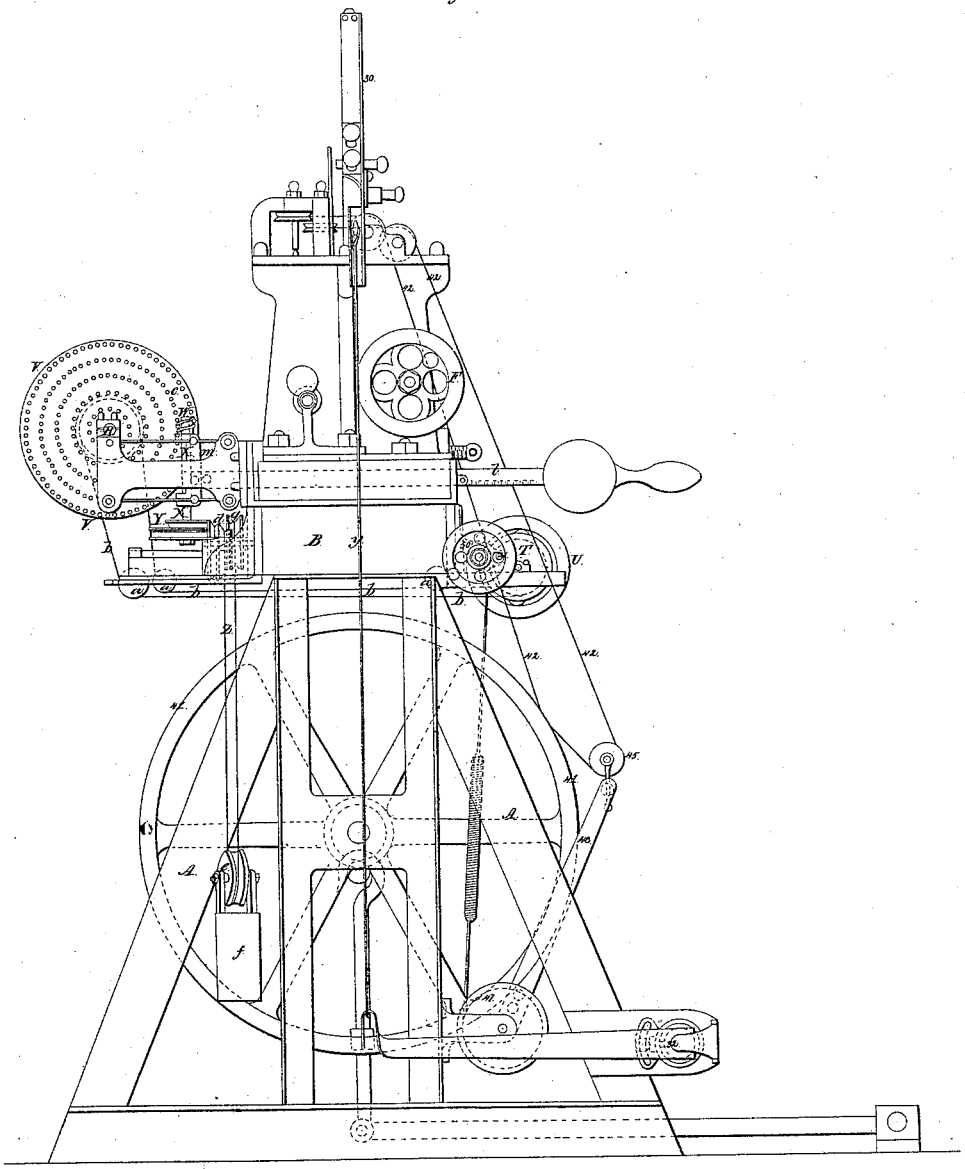

Sheet 4 - 5 Sheets
C. J. Hill,
Rose Engine,
N° 76,631. Patented Apr. 14, 1868.
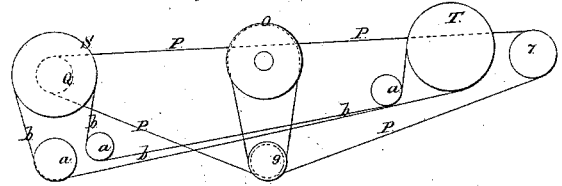
Fig. 7.
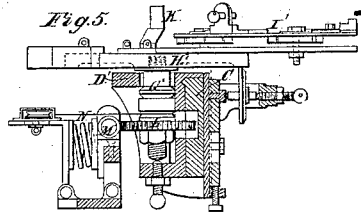
Fig. 5.
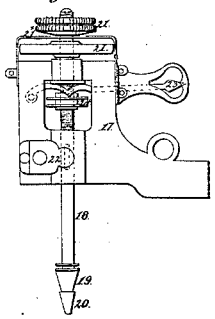
Fig. 8.
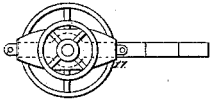
Fig. 9.
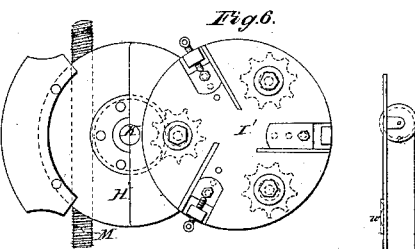
Fig. 6.
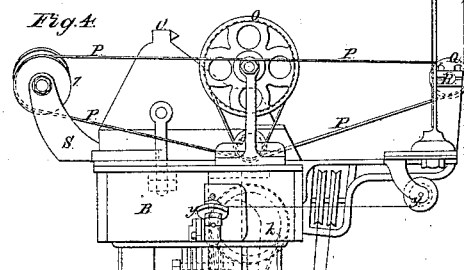
Fig. 4.
Fig. 13.
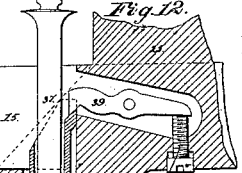
Fig. 10. Fig. 11. Fig. 12. Fig. 14.
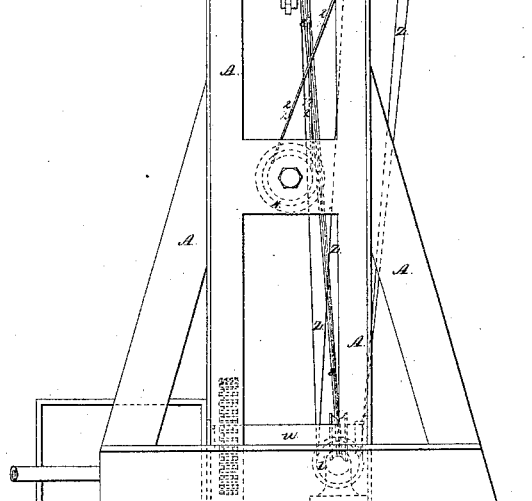
Witnesses. Inventor.
N. PETERS, PHOTO-LITHOGRAPHER, WASHINGTON, D.C.

Sheet 5-5 Sheets.

C. J. Hill,
Rose Engine,
N° 76,631. Patented Apr. 14, 1868.

Witnesses.

Inventor.

United States Patent Office.

CHARLES JOHN HILL, OF REGENT'S PARK, ENGLAND, ASSIGNOR TO JOSEPH SHEPHERD WYON AND ALFRED BENJAMIN WYON.

Letters Patent No. 76,631, dated April 14, 1868; patented in England, April 5, 1867.

---

MACHINE FOR PRODUCING REDUCED COPIES OF MEDALS, &c.

---

The Schedule referred to in these Letters Patent and making part of the same.

---

TO WHOM IT MAY CONCERN:

Be it known that I, CHARLES JOHN HILL, of Regent's Park, in the county of Middlesex, England, have invented certain new and useful Improvements in Machinery or Apparatus for the Production of Reduced Copies of Medallions and Matrices, and for preparing the cutting-tools for that purpose; and I hereby declare the following to be a full, clear, and exact description of the same, reference being had to the accompanying drawings.

This invention relates to a peculiar arrangement and construction of machinery or apparatus for the production of reduced copies of medallions and matrices, and to the cutters or cutting-tools employed in connection therewith; and in order that the said invention may be fully understood, I shall now proceed more particularly to describe the same, and for that purpose shall refer to the several figures on the annexed sheets of drawings, the same letters of reference indicating corresponding parts in all the corresponding figures.

Figure 1:
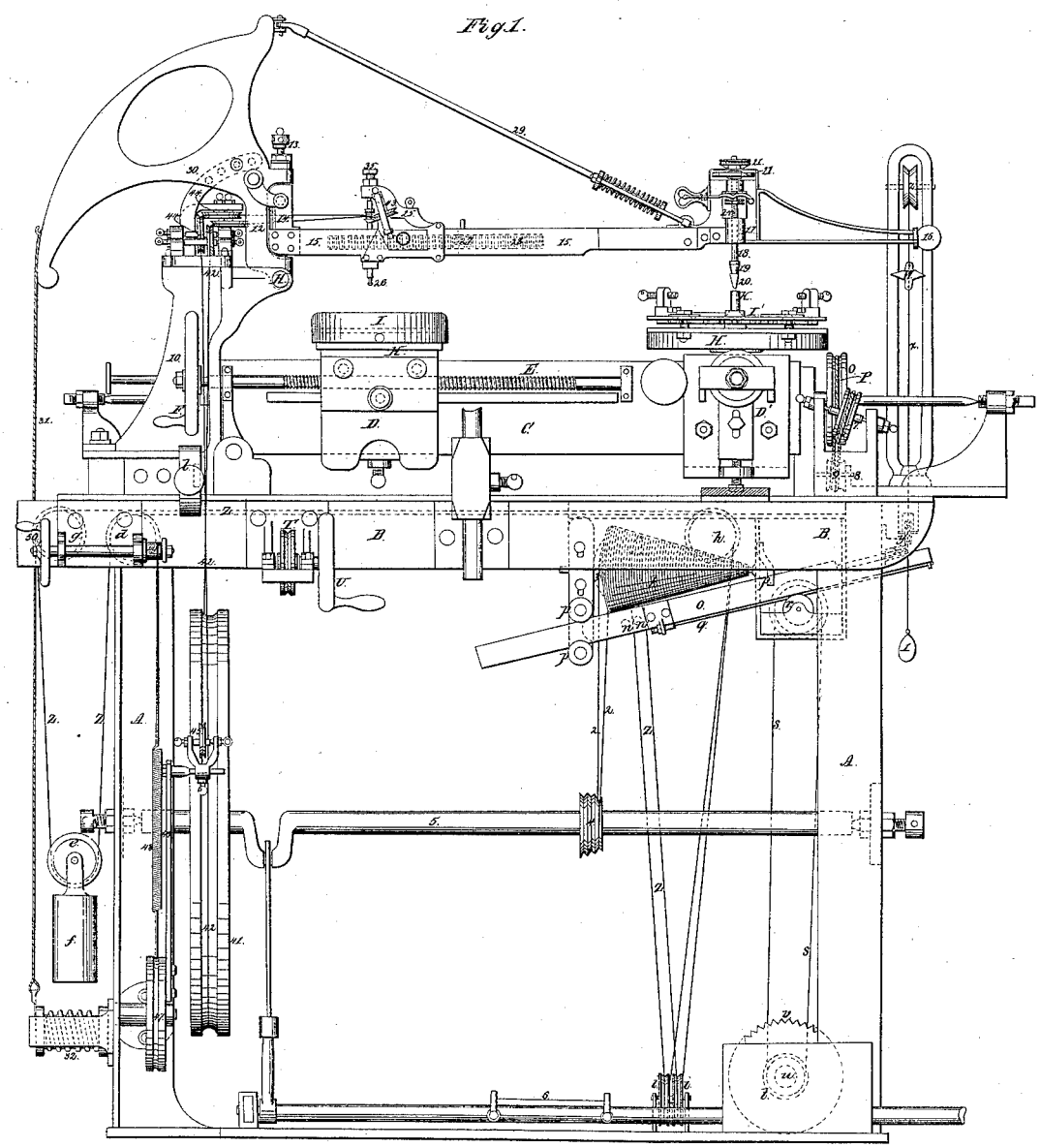

Figure 1, on sheet 1, of my drawings, represents a side elevation of my improved machine for the production of reduced copies of medallions and matrices complete.

Figure 2:
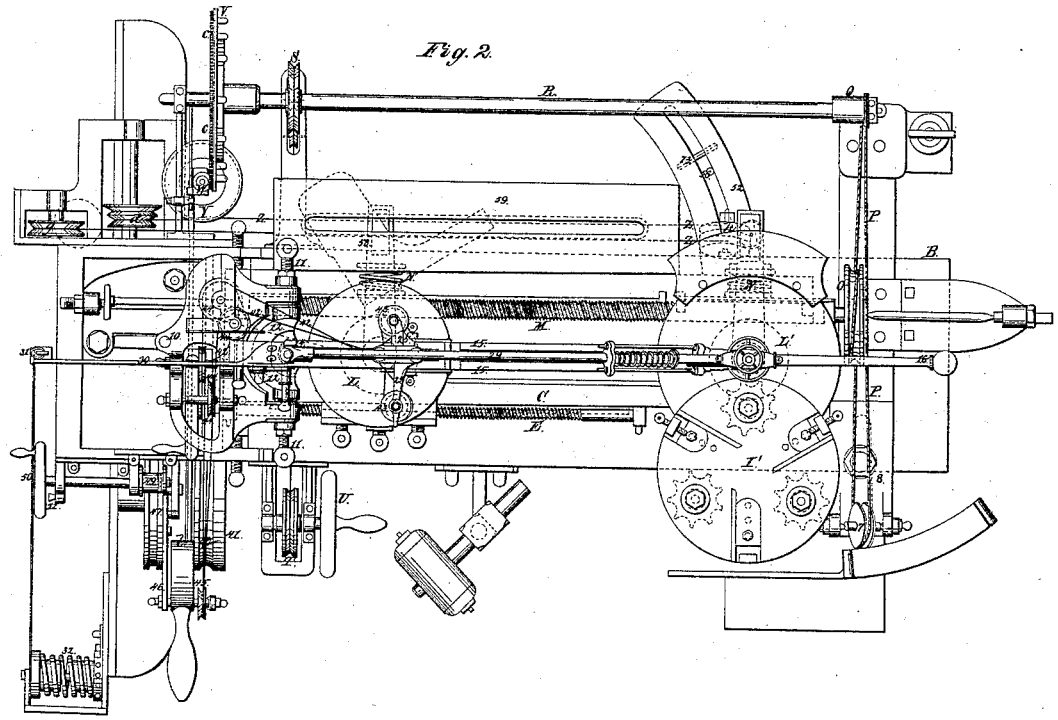

Figure 2, sheet 2, is a plan of the same.

Figure 3, sheet 3, represents an elevation of the left-hand end of the machine, as seen in fig. 1; and Figure 4, sheet 4, is a similar view of the opposite end of the machine.

The rest of the figures on the sheets of drawings represent various details hereinafter referred to, some of which are drawn to an enlarged scale.

A A are the two standards of the machine, supporting a table, B, upon which rest and to which are attached the various portions of the machine, to be hereinafter described. Along and upon about three-fourths of this table, B, there is placed what may be called the bed, C, so formed as to admit of two V-grooved heads, D D', being attached thereto. The one, D', at the right hand of the machine, is fixed, the other, D', when required, is caused to slide along the said bed C, to the position required, by a screw, E, connected with the same and the bed, which screw extends along the front of the bed, and, when used, is turned by a hand-wheel, F.

Figure 5, sheet 4, represents a detail sectional elevation, and Figure 6 is a corresponding plan, of the fixed head D'. These heads each contain a vertical mandrel, one of which is shown at G', in fig. 5, to the tops of which are screwed the horizontal circular revolving tables H H'. To the table H, attached to the head, on the left-hand end of the machine, there is fitted a receiver or chuck, I, for containing the die or material to be operated upon, and to the other table there is attached an adjustable chuck or holder, I', for containing the enlarged pattern to be traced from.

In the centre of the pattern-table, at the right-hand end of the machine, there is a raised pillar, K, the centre of the top of which coincides with the centre of the corresponding mandrel. The object of this arrangement is to admit of the proper adjustment of the mandrel supporting the work to the point of the cutter. To about the middle of each of the said mandrels there is attached a worm-wheel, L L', shown dotted in fig. 2, and against these worm-wheels a screw, M, which extends the whole length of the bed, is made to press, by the agency of spiral springs N, fixed in cases at the back of the screw, which is so held as to be rigid except in a direction towards or from the worm-wheels L L'. The screw M is caused to revolve, and, by acting upon the worm-wheels, to turn the tables at various speeds, according to the discretion of the operator, by gearing, hereinafter described.

Attached to the right-hand end of the screw there is a pulley, O, which is connected, by a gut band, P, with a smaller pulley or drum, Q, at the back of the machine, which drum is fixed at the right-hand end of a spindle, R, extending nearly the whole length of the machine.

The spindle R carries another pulley, S, over which, and under the guide-pulley $a$, a gut band, $b$, passes, which is brought over a pulley, T, attached to the front part of the machine, and, when used, is turned by a hand-wheel, U. The object of this arrangement of bands and pulley, of which I have shown a diagram at Figure 7, sheet 4, is for the purpose of adjusting the work to the cutter by a quick motion of the screw M.

At the left-hand end of the spindle R, and attached thereto, is a circular plate, V, figs. 2 and 3, from the outer side or face of which project circles of cogs or teeth, or pins, $c$, the spindle R, upon which the plate V is fixed, being concentric to these circles. These cogs, teeth, or pins, $c$, are acted upon by an endless screw, W, which is attached to the top of a vertical spindle, X, at the lower end of which there is a two-grooved drum or pulley, Y, fig. 2, which is made to revolve by a gut band, Z, passing round one or other of the two grooves in such pulley. One portion of this band Z passes direct from the pulley Y over one of the grooves in the guide-pulley $d$, thence under the pulley $e$, contained in a weight, $f$, to attain an equal tension of the said gut band. It then passes up over the guide-pulley $g$, along the back of the machine, near the right-hand end of which there are two grooved guide-pulleys, $h$, over which both parts of the bands pass, the one downwards, and the other upwards, and under the guide-pulleys $i\ i$, at the base of the machine. From these pulleys $i\ i$ it passes up to and over a long conical drum, $k$, grooved or roughened annularly from end to end, which revolves on centres screwed into a frame attached to the under side of the main table, B, of the machine. The said screw W is made to gear into any of the said circles of teeth or pins, $c$, in the flat circular plate V, or to take a position between the circles of such teeth, and thus release them, by a weighted lever or bar, $l$, being connected to the frame $m$, which holds the spindle X, carrying the screw W and the two-grooved drum or pulley Y, such bar being provided with notches, as shown, which take into a catch or projection in front of the machine, the locking of a particular notch determining the position of the screw W.

The gut band Z is made to take any position upon the conical drum $k$, by being held between two small revolving guide-rollers, $n$, which are attached to a flat bar, $o$, made to move to and fro longitudinally, in front of the long conical drum, through suitable guides $p\ p$, by a gut band, $q$, being attached to each end of it, passing once or twice round a pulley or drum, $r$, upon which one end of the bar $o$ rests. Another gut band, $s$, passes over another and larger portion of the same pulley or drum, $r$, and under another pulley, $t$, at the base of the machine, which is carried by a spindle, $u$, to which is also attached a notched or roughened wheel, $v$, such wheel being turned to the right or left by the foot of the operator, who thus adjusts to the required position the said gut band Z, on the long conical drum $k$, according to the desired speed of rotation of the two chucks I and I', which, respectively, hold the work and the pattern.

The position of the gut band Z on the conical drum $k$ is shown by an indicator, $w$, attached by a thin gut or cord, $x$, to the right-hand end of the flat bar $o$, which is conducted by the guide-pulleys, at $y$, over an overhead pulley, $z$, at the back of the machine, and has a weight or drop, 1, attached to its lower end.

The conical drum $k$ is connected by a crossed gut or band, 2, passing over a deep groove, 3, formed at the left hand or larger end of the drum $k$, with another drum or grooved pulley, 4, carried by the crank-shaft 5, which turns on centres in the main standards, A, of the machine. The crank-shaft is driven by a foot-treadle, 6, in the usual way, or by a band and pulley, or otherwise.

The operation of this part of the machine is as follows: Circular motion being given, by the foot or other power, to the shaft 5, the pulley 4, attached to it, is caused to revolve, which, having a gut band, 2, round it, and round the deep groove, 3, of the long conical drum $k$, the same is also caused to revolve, and, having another gut band, Z, over it, transmits motion to the pulley or two-grooved drum Y, at the base of the spindle X, carrying the worm or endless screw, W, at the top. This latter, by gearing with the teeth or pins $c$, projecting from the flat plate V, fast on the spindle R, at the back of the machine, causes the same to revolve, and, consequently, drives the drum Q. The drum Q is connected by the gut band P with the pulley $o$, on the right-hand end of the long screw M, and transmits motion to such screw, which, being geared with the worm-wheels L L', attached to the heads D and D', causes the same to revolve and impart a circular motion to the chucks, I I', for holding the die or substance to be worked upon, and the pattern, respectively.

The upper part of the band or gut, P, passes direct across the end of the machine, from the upper surface of the pulley Q, over the guide-pulley 7, which is carried in an adjustable bracket, 8, connected to the table, B, of the machine. From the under side of the pulley 7, the gut P passes round the guide-pulley 9, (see figs. 4 and 7,) and over the pulley $o$, whence it passes round the second groove in the pulley 9, and returns to the pulley Q, on the under side thereof.

To the left-hand end of the main table of the machine, and joining the bed, a strong support, 10, is attached, to the top of which, (suspended by horizontal centres 11,) is a head, 12, to which is attached, by vertical centres 13, (see fig. 1,) screwed through the same, another head, 14, the two together forming a universal joint. To this joint are bolted two flat parallel bars, 15, disposed, one on each side of the head 14, which bars extend towards the right-hand end of the machine, where a handle, 16, is provided, by which the operator guides the tracer and cutting-tools, as hereinafter described. These parallel bars extend over the two tables H and H', and chucks I and I', and at their right-hand ends they are bolted to the opposite sides of the bracket or frame 17, shown in detail elevation and plan at Figures 8 and 9. This frame, 17, should be so situated as to be capable of passing over the centre of the right-hand mandrel, G', which turns in the fixed head D', and it carries a vertical adjustable cylindrical spindle, 18, at the lower end of which a nose, 19, is screwed, to which tracers, 20, of various sizes and shapes, are also screwed. The upper portion of this rod is screwed, and it is raised, lowered, and fixed by back and front set-nuts 21.

$21^\times$ is a spring, which tends always to keep the spindle 18 and the steel bush, attached to the lower nut, 21, through which the spindle is screwed, jammed in an upward direction. It is also provided with a longitudinal slot, into which a guide is forced by a spring, 22, for the purpose of guiding the same and preventing the spindle from turning when being adjusted.

A small indicator or finger, 23, centred to the frame 17, and resting upon nuts 24, carried by the spindle 18, which carries the tracer-point, serves to indicate the length or amount of wear taking place in the cutting-tool hereinafter referred to. Another frame, 25, carrying the cutting-tool 26, is also attached to the two parallel bars 15, before referred to, which can be moved along the same to any required position. This is effected by a pinion, 27, carried by the said frame, and gearing into a rack, 28, extending along and contained between the parallel bars 15.

The varying weight or strain on the bars 15, according to the position of the movable frame thereon, is compensated by means of a tension-rod, 29, attached to such bars, and connected by a bell-crank, 30, and gut 31, with an adjustable spring, 32, attached to the lower portion of the left-hand standard, A, of the machine.

The bars 15 are kept elevated, when the machine is out of action, by a pin passed through the bell-crank 30, and into one or other of a series of holes made in a curved bracket, as shown clearly in fig. 1. They are also locked or prevented, when out of action, from swinging laterally, by a pin passing through an arm jointed to the bell-crank 30, and entering a hole in the head 14, to which the bars are attached.

When commencing a piece of work, a strong mandrel, 33, (see detail, Figure 10,) is placed in the movable frame 25, in a vertical position, being held by a collar, 34, below, and a centre-screw, 35, above. To a holder, 36, screwed into the lower end of this mandrel, there is screwed a rose-cutter, 26, shown in enlarged detail at Figure 11, but when the final operations have to be performed, the said mandrel, 33, is removed, and a lighter one, 37, shown in detail elevations at Figure 12, in transverse section at Figure 13, and in plan of the under side at Figure 14, is substituted, carrying differently-formed cutters, hereinafter described. In this case, a temporary collar, 38, is to be added, which is firmly held down by a lever, 39, acted upon by a screw, 40, both of which are contained within the movable frame 25.

The end of the lever 39 is provided with an inclined projection, which engages with a v-notch in the temporary collar, 38, (shown in fig. 13,) by the action of the screw 40, thus holding the collar or loose bush in its place. These mandrels are driven from the large wheel 41 fast on the crank-shaft 5, by a thin gut or band, 42. This gut passes round a sheave on the mandrel, and thence round one of the guide-pulleys, 43, carried by the frame 25; it then returns round the opposite side of the sheave on the mandrel, and round the second of the two guide-pulleys 43, whence it returns to the sheave on the mandrel, and both parts of the gut then pass over the horizontal and vertical guide-pulleys at 44, and thence round the large wheel 41. The proper amount of tension of the gut is maintained by passing it round a pulley, 45, carried to the end of light adjustable arm, 46. This arm is situate in front of the large wheel 41, and is attached to a pulley, 47, and made to increase or diminish the tension of the gut band 42, by the action of a spiral spring, 48, in connection with such pulley, and with a drum, 49, and hand-wheel 50, provided with holes for locking on to a catch, 51.

I shall now proceed to describe the mode of and means for ascertaining the correct length of cutter with relation to the tracer.

Figure 15:
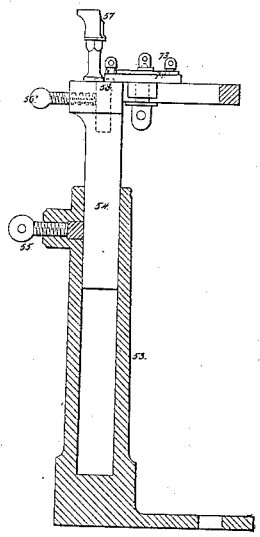

At the back of the right-hand end of the machine, and attached to a curved slotted bracket, 52, level with and fixed to the side of the main table B, there is fitted a horizontally-adjustable vertical socket, 53, (see detail, Figure 15, sheet 5,) carrying a vertically-adjustable spindle, 54, fixed by a lateral set-screw, 55. On the top of this spindle there is provided a horizontal smooth surface, 56, the position of which only is shown in fig. 2, so situate that the tracer-point 20 can be readily brought over and made to rest upon the centre of such smooth surface. The rod or stem of the tracer is pressed against a guide-bar, 57, in order to insure the placing of the point of the tracer on the same spot at each separate adjustment, that is to say, each time the cutter has been removed for sharpening, or for changing for another form of cutter. This smooth surface consists of a hardened piece of steel, which is let into the top of the adjustable spindle 54, and projects slightly above it, as shown in dotted lines in fig. 15, a set-screw, $56^\times$, serving to hold it in its place. Another movable socket, 58, is made adjustable along the slotted plate 59, which is bolted to the main table of the machine, the position of such socket being indicated by dotted lines only in fig. 2.

Figure 17:
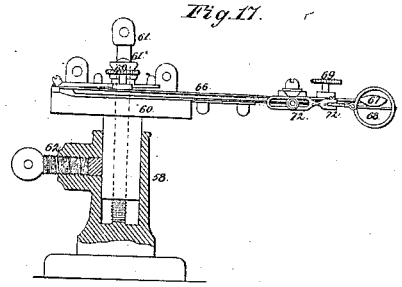
Figure 18:
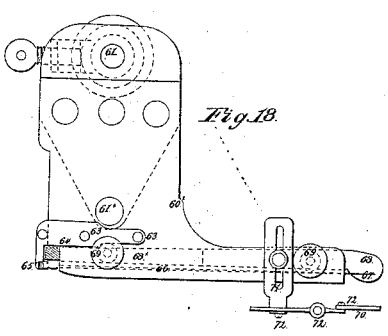
Figure 19:
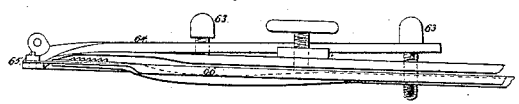

At Figures 17 and 18 I have represented an enlarged detail sectional elevation and plan of this socket, with the parts connected therewith. Within this socket there is fitted the stem of a vertically-adjustable table, 60, carrying an overhanging plate, $60^\times$, which may be roughly adjusted to any desired height by the vertical adjusting-screw 61, and fixed in position by the pinching-screw 62. To the front edge of the plate $60^\times$, and at the left-hand corner thereof, there is fitted, by means of the adjusting-screw 63, a plate, 64, shown on a larger scale in the detail side elevation, Figure 19, to which plate, 64, is secured the end, 65, of a long flexible arm or indicator, 66, the free end, 67, of which should, in its adjusted position, be so nearly in contact with the surface of the plate 68, situate beneath it, that the finest possible line of light can be seen between them. The object of the plate 64 is to enable the indicator to be suspended in a central position between the plates $60^\times$ and 68. The plate 68 is also attached to the plate $60^\times$, and is capable of adjustment towards or from the under side of the plate $60^\times$, by the screw 69. A powerful magnifier, 70, is attached to the plate $60^\times$, and made adjustable in any desired position by the aid of the slotted plate 71 and joints 72, the object of this magnifier being to facilitate the observation of the exact position of the end of the indicator as regards the plate 68.

Figure 16:
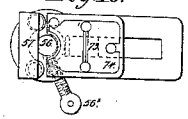

I shall now proceed to describe the mode of ascertaining the correct size of cutter in relation to the tracer. Behind the horizontal smooth surface 56, (see figs. 15 and 16,) there is a small $\wedge$-shaped projection or ridge, 73, the position of which is indicated in fig. 2, attached to a sliding plate, 74, so arranged that by placing the said tracer-point on each side alternately of the ridge, and moving such ridge laterally a distance equal to the width of the ridge at its base or broadest part, and by turning the cutter, which is at the same time brought on to a piece of wax or other suitable impressible material, 75, placed on the end of the plate $68^\times$, at the back of the indicator 66, hollow dots will be produced in the wax, which dots, if perfectly round, and just touching one another at their circumference, and their depth being equal to half their diameter, will indicate that the size of the cutter is correct in relation to the size of the tracer. An adjusting-screw, $69^\times$, serves to elevate the wax surface until the point of the cutter sinks to the proper depth therein.

In using this machine, the operator first adjusts his work on the chuck I, and the enlarged copy of the medallion on the chuck I'. He then adjusts the position of the movable frame 25 along the bars 15, according to the amount of reduction required; the smaller the copy, the nearer will be the frame 25 to the left-hand end of the machine. He then adjusts the head D, with its chuck I, holding the work so as to bring the centre of the mandrel, which carries the chuck, under the point of the cutter. The height of the cutter 26 and tracer-point 20 is now adjusted, so that a horizontal line, drawn through the centre, 11, shall just touch the points of the cutter and tracer respectively, the bars 15 being at the same time also in a horizontal position. The pattern is now raised by suitable adjusting-screws, until the medium depth or height just touches the point of the tracer, after which the work is similarly elevated until it comes in contact with the point of the cutter, where it is fixed by screws or other means. The size of tracer is then selected, according to the work to be produced, and the relative size of cutter, as regards the tracer, ascertained by the use of the wax surface, as hereinbefore described.

The machine is now ready for operation, but in order to insure the placing of the cutters subsequently employed at the same height as the one already adjusted, the bars 15 are moved laterally, so as to bring the tracer-point up on the smooth surface 56, which movement will bring the point of the cutter over the indicator 66, carried by the vertically-adjustable plate $60^\times$. This plate is then elevated by the screw 61, until the fixed end of the indicator is brought nearly in contact with the point of the cutter. The finer adjusting-screw $61^\times$ is now brought into action, until the indicator comes into actual contact with the cutter, the point of contact being shown by the red line in fig. 17. The instant that contact takes place will be clearly shown by the dipping of the free end of the indicator, the adjustment being continued until only the faintest line of light can be observed between the end of the indicator and the surface of the plate 68.

As the cutter wears shorter, it is lowered, by screwing up the tracer-spindle until the point of the cutter deflects the indicator 66 to the same amount as it did in the first instance; the tracer-point resting, at the same time, upon the smooth surface 56. The operator then draws the bars 15 forward, so as to bring the tracer-point 20 over the medallion to be reduced, and the cutter over its work, and the machine being started, a rotatory motion will be conveyed to the cutter by the band or gut 42. The screw M transmits at the same time a rotatory motion to the chucks I and I', and the operator then traverses the tracer and cutter, by hand, to and fro over the work and pattern, until the entire surface has been roughened out by the aid of the "rose"-cutter or roughening-tool, fig. 11. He then inserts the smaller mandrel and temporary collar with the finer tool, of the shape shown in Figure 20, and continues the operation, using finer tools as the work approaches completion.

In making the large rose-cutters, shown by fig. 11 of my drawings, a blank is first turned in a lathe, and the centre drilled out to about one-quarter the diameter of the cutter, and to a depth of about three-quarters the diameter of such cutter. A number of cuts or teeth are then made in the end of the cutter, as shown in the drawing, by a circular file or otherwise.

Figure 20:
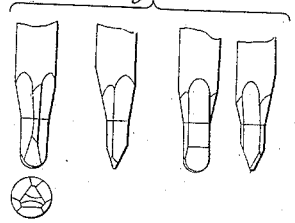

When making the smaller cutters, several views of which are shown in enlarged detail elevation and plan at fig. 20 of my drawings, I take a piece of thin, hardened steel, and place it in a holder capable of being screwed into the smaller mandrel of the engraving-machine before referred to. I then bring one end of the wire at the desired angle in contact with a stone, made to revolve, and cut a series of facets thereon, as shown at fig. 20.

Figure 21:
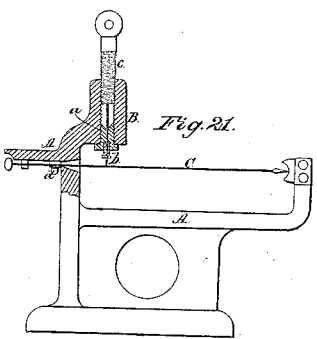

When the tools have become too short for further adjustment in the engraving-machine, it becomes necessary to set them up or cause them to protrude rather more beyond their holding-nozzle $b$, and as this operation requires considerable nicety of adjustment in order to insure the exact required amount of projection of the tool, I propose to employ for that purpose the adjusting-apparatus shown in side elevation, and partly in section, at Figure 21. This apparatus operates on precisely the same principle as the indicator 66 of the engraving-machine hereinbefore referred to. It consists of a stand, A, provided with an internally-screwed vertical bracket, B, into the lower end of which is inserted the screw-plug $a$.

The tool-holder or nozzle $b$, containing the tool to be adjusted, is screwed into the plug $a$, and a screw-spindle, $c$, carrying a short length of steel wire, is screwed into the upper part of the bracket B. A conical recess is formed on the top of the plug $a$, to insure the entrance of the steel wire into the central aperture of the nozzle $b$, so as to direct such wire against the upper end of the cutter.

Beneath the point of the cutter there is placed a long flexible indicator, C, which is centred at $d$ to the stand A, so as to admit of it being moved to one side, to allow of the introduction and removal of the nozzle and tool. The free end of this indicator is pointed, and plays between two stops or points at $e$.

The adjustment of the length of the tool is effected by screwing down the screw-spindle $c$, which causes the steel wire attached thereto to force the tool more or less out of the holding-nozzle $b$, so soon as the point of the tool comes in contact with the indicator C. Such contact is clearly indicated by the dipping of the point of the indicator, which shows that the proper length of tool has been protruded beyond its holder.

*Claims.*

1. The peculiar system or mode of an apparatus for ascertaining the correct length or depth of the cutter in relation to the tracer-point, substantially as hereinbefore described, and illustrated by the accompanying drawings.

2. The peculiar system or mode of and apparatus for determining the correct size of cutter to be used in relation to the size of the tracer-point, substantially as hereinbefore described, and illustrated by the accompanying drawings.

3. The employment, in this class of machinery, of removable mandrels, of different sizes, adapted to the various-sized cutters required, as hereinbefore described, and illustrated by the accompanying drawings.

4. The employment, in this class of machinery, of an arm, working on a universal joint at one end, and actuated by hand at the opposite end, such arm carrying an adjustable frame, with cutter-mandrel and rotary cutter, and a fixed frame, with vertically-adjustable tracer, the whole being arranged and operating substantially as hereinbefore described, and illustrated by the accompanying drawings.

5. The peculiar construction of rose-cutters, as hereinbefore described, and illustrated by the accompanying drawings.

6. The peculiar construction of finishing-cutter, as illustrated by the accompanying drawings.

In witness whereof, I have signed my name to this specification in the presence of two subscribing witnesses.

CHAS. J. HILL.

Witnesses:
 JOHN J. VIDLER,
 W. GORTON.